K. OLEJNICZAK.
INSECT TRAP.
APPLICATION FILED FEB. 12, 1917. RENEWED MAY 7, 1918.
1,271,355.
Patented July 2, 1918.
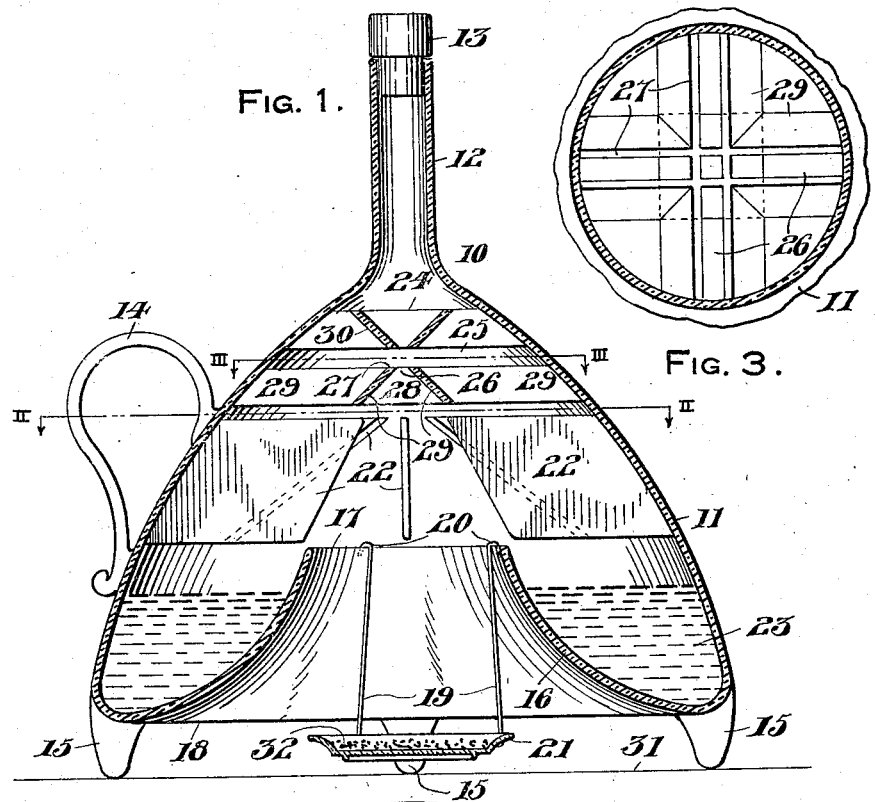
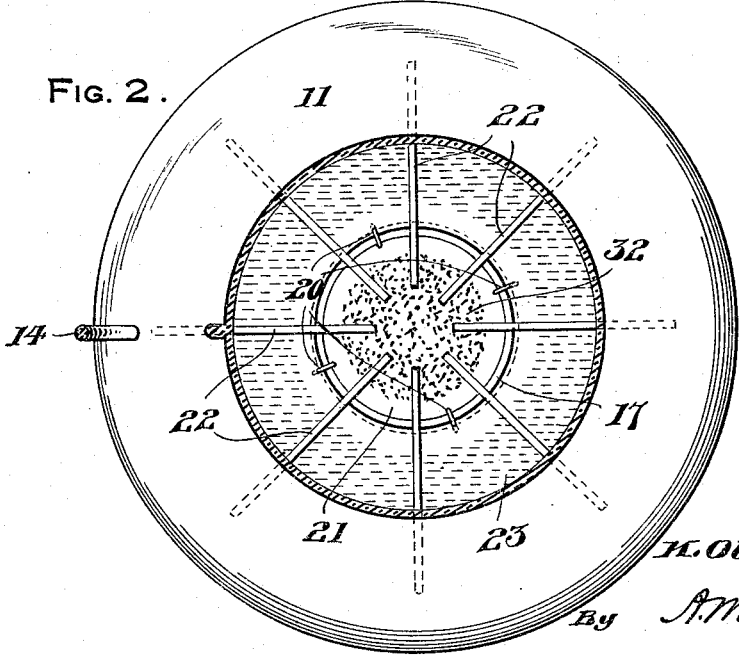
Inventor
K. Olejniczak

UNITED STATES PATENT OFFICE.

KAISER OLEJNICZAK, OF BUFFALO, NEW YORK.

INSECT-TRAP.

1,271,355. Specification of Letters Patent. Patented July 2, 1918.

Application filed February 12, 1917, Serial No. 148,042. Renewed May 7, 1918. Serial No. 233,175.

*To all whom it may concern:*

Be it known that I, KAISER OLEJNICZAK, a subject of the Emperor of Austria, residing at Buffalo, in the county of Erie and State of New York, have invented certain new and useful Improvements in Insect-Traps, of which the following is a specification.

This invention relates to certain new and useful improvements in insect traps.

The primary object of the invention is the provision of a trap having the external appearance of a bottle and arranged with a bait for insects, an insecticide being arranged within the device for killing the insects which enter the same.

A further object of the device is the provision of a fly trap having a pleasing external appearance and arranged with an entrance for insects adjacent which entrance a suitable bait is arranged, the interior of the trap being provided with means tending to confuse the flight or travel of the insects, an insecticide being provided in which the insects are finally captured.

With these general objects in view and others that will appear as the nature of the invention is better understood, the same consists in the novel construction, combination and arrangement of parts hereinafter more fully described, illustrated in the accompanying drawings, and then claimed.

In the drawing forming a part of this application and in which like designating characters refer to corresponding parts throughout the several views:—

Figure 1 is a central vertical sectional view of the device.

Fig. 2 is a transverse sectional view taken upon line II—II of Fig. 1, and,

Fig. 3 is a similar view taken upon line III—III of Fig. 1.

The device is designed for capturing insects such as flies and broadly consists of a bottle-shaped casing 10 formed of transparent material or otherwise as desired, the same having a flaring body 11 with a contracted neck 12, a closure plug or stopper 13 being arranged in the open end of the neck at the top of the device. A handle 14 is provided upon one side of the body 11 while four supporting feet 15 are arranged therebeneath giving the device the general appearance of a decanter.

The bottom 16 of the body 11 is of inverted funnel shape having a contracted mouth 17 arranged inwardly of the body 11 while the feet 15 are attached to the lower annular outer portion 18 of the body 11. Depending wires 19 are arranged with terminal hooks 20 seated over the mouth or rim 17 of the bottom 16 while a bait supporting saucer 21 is carried by the said wires 19 and is thereby arranged in axial alinement with the body 11 below the level of the bottom 18 allowing sufficient space for the entrance of insects through the bottom mouth 17 into the body 11.

A plurality of quadri-lateral inwardly-extending and radially edgewise arranged wings 22 are positioned within the body 11 above the level of the mouth 17 with upwardly and inwardly inclined converging opposite edges while a poisonous fluid or body 23 adapted for killing the insects is arranged in the annular space between the bottom 16 and the adjacent side of the body 11. The wings 22 are designed to confuse the flight of insects within the device and for furnishing additional labyrinths therein, oppositely formed frames 24 and 25 being provided within the body 11 arranged in parallelism between the wings 22 and the neck 12. These frames are of general cruciform arrangement having centrally elongated passages 26 centrally of the four arms 27 of the frame while the central passage 28 is arranged through the frame 25 of truncated pyramidal form. The sides 29 of the frame 25 converge upwardly while the corresponding sides 30 of the frame 24 converge downwardly.

In operation, the device is positioned upon a support such as a table top 31 and with a suitable bait, such as sugar 32 within the saucer 21, the insects or flies attracted by the bait will fly and crawl upwardly upon the bottom 16 and through or over the mouth 17 thereof. The insects may crawl downwardly upon the inside of the bottom 16 into the poison 23 and be killed or upon flying upwardly within the body 11, will come in contact with the wings 22 and being confused thereby, may pass upwardly through the frame 25 and also the frame 24 while upon becoming exhausted in their efforts to escape, the insects will drop downwardly finally entering the poison 23 and being killed thereby. The bait supporting wires 19 are readily removed from the bottom 16 while the stopper 13 may be removed for flushing and cleaning the device when found desirable. An insect trap is arranged which does not present the appearance of a fly catcher but resembles an ordinary bottle structure although being capable of performing the functions for which the same is designed.

What I claim as new is:—

A trap of the type described, including a body portion of inverted general funnel shape, with an interior upwardly curved annular chamber-forming portion, a plurality of quadri-lateral radially edgewise arranged baffle-members positioned above, and spaced from said chamber forming portion also spaced edgewise and laterally from each other, and oppositely formed frames arranged in parallelism between said plurality of quadri-lateral radial members and the neck of the funnel-shaped body-portion, forming other baffle-members, said frames or members being of general cruciform arrangement, having centrally elongated passages centrally of their arms, one of said frames being of truncated pyramidal form, the sides of one frame converging upwardly while the corresponding sides of the other frame converge downwardly.

In testimony whereof I affix my signature.

KAISER OLEJNICZAK.

Copies of this patent may be obtained for five cents each, by addressing the "Commissioner of Patents, Washington, D. C."